April 18, 1950     O. H. BANKER     2,504,173
OVERRUNNING CLUTCH
Filed Jan. 11, 1945
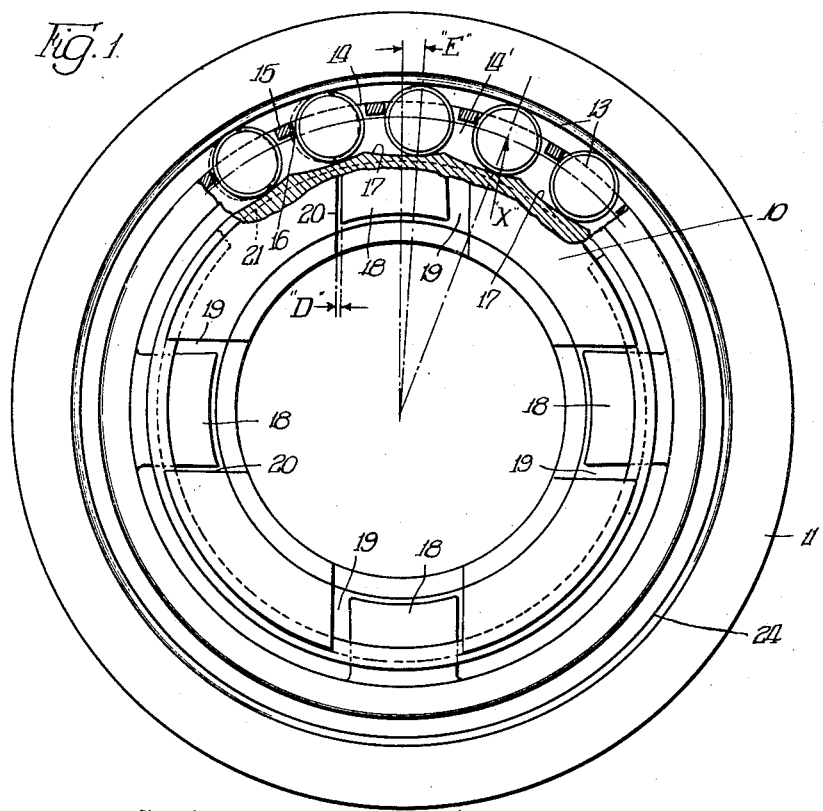
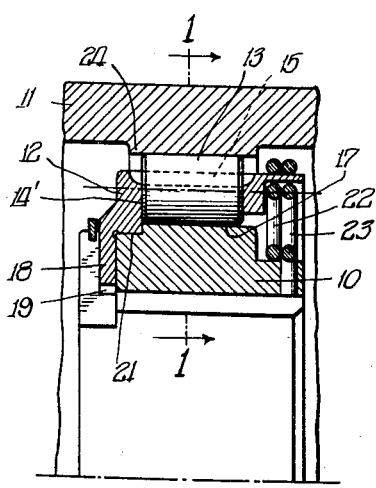
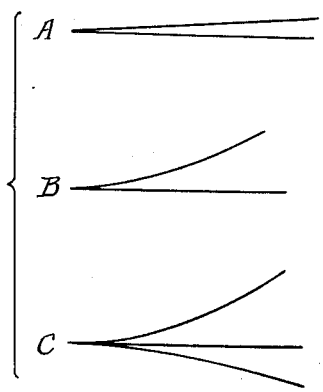
INVENTOR.
Oscar H Banker,
BY
Cromwell, Greist + Warden
Attys Patented Apr. 18, 1950

2,504,173

UNITED STATES PATENT OFFICE 2,504,173

OVERRUNNING CLUTCH

Oscar H. Banker, Evanston, Ill., assignor to New Products Corporation, Chicago, Ill., a corporation of Delaware Application January 11, 1945, Serial No. 572,361

6 Claims. (Cl. 192—45)

This invention relates to certain improvements in an overrunning or one-way clutch of the type wherein a concentrically arranged driving or cam member and a driven or drum member are coupled for transmission of torque therebetween and rotation as a unit by a series of interposed, circumferentially spaced, cam engaging rollers.

It is an object of the present invention to provide a clutch of the type described wherein driving engagement of the members and rollers is attained by a relatively short angular displacement of the driving member relative to the driven member, so that said members may be unfailingly drivingly connected, and similarly declutched during the overrunning phase, in a very short interval of time.

Another object is to provide an improved overrunning clutch characterized by a rotatable member which in normal operation is coupled to rotate at the maximum sustained speed of the clutch-driving or -driven elements, a member capable of rotation relative to said sustained speed member in another, or overrunning, phase of operation, and a roller cage interposed radially between said members, in which cam surfaces are provided on said sustained speed member for wedging engagement with the rollers of said cage during the normal phase of operation, the cage being spring urged for said engagement, and in which provisions are made to nicely correlate the centrifugal force exerted by said rollers in said other or overrunning phase with the spring force normally exerted on said roller cage, whereby to produce angular creep of said cage relative to the sustained speed member in said last named phase, and thereby eliminate tendency of the rollers to be scuffed or otherwise unduly worn or damaged in overrunning.

A further object is to provide a clutch device of the type described which is characterized by substantially uniform transmission of radial clutching force through the rollers regardless of the load imposed on the clutch; and wherein likelihood of wedging of the rollers between the driving and driven members, with resultant failure to release when the direction of driving force is reversed, is eliminated.

A further object is to provide a clutch device of the type described including a driving cam member of novel and improved character having increased life and capacity; which cam member is readily adaptable for interchangeable use in clutches of the type under consideration, regardless of the direction of rotation of the driving member, and which is admirably adapted to withstand shock loads without jamming.

A still further object is to provide a clutch device of the type described characterized by improved operation during the overrunning phase, whereby any tendency to damage the coacting cam, rollers or drum during this phase is avoided.

Still a further object is to provide a device of the type described having novel provisions for insuring early assumption by the rollers and coacting cams of an accurately spaced relationship to one another, whereby the cams are thereafter uniformly and accurately engaged by said rollers and transmission of force by the rollers is uniformly distributed thereamongst.

Yet a further object is to provide a clutch device of the type described including a novel rotatively guided cage construction and coacting provisions to free the cage rollers from the cam member during overrunning or free wheeling, with two-point contact on the rollers in this phase and consequent improvement and lengthening of the life of the rollers.

In the drawings,

Fig. 1 is an end face view, partially broken away and in vertical section on a line corresponding to line 1—1 of Fig. 2, illustrating the improved clutch of the invention;

Fig. 2 is a fragmentary view in transverse vertical section, illustrating further details of the construction; and Fig. 3 is a diagrammatic view incorporating three arbitrarily plotted curves, illustrating characteristics of the cam and roller wedging angles for clutches of this general type, including that of the present invention, from a study of which the advantages of the present improvements will be clarified.

Referring to the drawings, in Figs. 1 and 2 I illustrate the overrunning or one-way clutch of this invention, which is generally of a well known cam and roller type, including an inner driving or cam member 10 which for purpose of description will be assumed to be driven by a relatively high-speed actuator. It is a feature of the invention that the cam-bearing member of the clutch is the member which rotates at the normal or rated highest sustained speed of the clutch-driving or driven elements, usually the driving member, but not necessarily so in all installations. The assembly also includes an outer driven member or drum 11 from which the torque of the clutch is transferred to an appropriate driven instrumentality, and an interposed cage member 12 having a plurality of clutch rollers 13 equally spaced circumferentially in said cage member and guided thereby in the operation of the clutch, as will be described.

I prefer that the cage member 12 shall be fabricated in the manner illustrated and described in my U. S. Patent No. 2,356,298, dated August 22, 1944. In accordance with the disclosure of that patent, reference to which may be had for further particulars, an appropriate cage body is subjected to action by a milling cutter at equally spaced points about its periphery, the cutter being arranged so as to form roller receiving slots 14 extending radially through the cage body into intersection with an inner annular undercut groove 14' of the body. Thus the slots 14 are produced by a single operation in a cage which is otherwise of integral, one-piece construction in its entirety, and having increased strength and rigidity for this reason, as described in the patent referred to.

Slots 14 are separated circumferentialy of the cage by the transverse spacer bars 15 and it should be noted particularly as a detail of the present invention that the cage body is so chosen and/or undercut that the inner periphery of the bars 15 is located radially outwardly of the locus line, or circumferential pitch line, of the centers of rollers 13. Accordingly, upon driving rotation of the cam member 10 in counterclockwise direction as viewed in Fig. 1, the rollers 13 will be engaged with the lower edge 16 of the bar 15 immediately to the left thereof.

This edge 16 is practically a knife edge at the point of engagement, and in the engagement of rollers 13 by such a knife edge at one radial side of the roller centers (radially outwardly thereof in the embodiment illustrated) the clutch has imparted thereto a distinct advantage, viz., the rollers are enabled to assume very quickly the ultimately desired uniform wedging relationship to the driving cams 17 on the exterior periphery of cam member 10. These cams will hereinafter be referred to in greater detail. While it is a comparatively easy matter to select a group of rollers (twenty in the illustrated embodiment) which are within a fairly close range of tolerance as to radius, nevertheless, if there are differences in their radius, or if the spacing of the cams 17 on member 10, either circumferentially or radially, is not strictly accurate, or if the spacing of roller guide slots 14 is slightly inaccurate, then only a certain number less than the total rollers 13 will be properly engaged with a coacting cam when the clutch goes into operation. This is so since only a portion of the rollers will normally be engaged by the adjacent bar 15 and urged thereby onto a cam; the remainder will not be so engaged, hence will idle. The errors leading to this lack of uniformity of engagement will never amount to more than a few thousandths of an inch; therefore by assuring that only a knife edge 16 on the cross bars 15 originally comes into engagement with the rollers, I assure that those edges which initially engage the rollers against the cams with undue pressure, due to any of said manufacturing inequalities, will wear down after but a short period of operation, until all of the rollers are uniformly engaged and urged onto the cams 17 by the cross bars.

Referring to Fig. 2, it will be observed that the cage member 12 on one side thereof is provided with radially extending actuator lugs or "fish tails" 18, there being four in the illustrated embodiment, which lugs extend into slots or pockets 19 on the cam member 10. Said slots are usually formed integrally in the cam member and the forward and rear walls thereof serve as stops limiting movement of the cage in either direction. It will be observed in Fig. 1 that the backlash space D between the lugs 18 and the adjacent wall surface 20 on the cam member is comparatively small. In the present embodiment, this space is of the order of one-sixteenth inch for reasons to be referred to in the explanation of the improved operation of the clutch.

It will also be observed in Fig. 2 that the cage 12 is provided with a circular inner bearing shoulder 21 which is rotatively guided on a similar shoulder on the cam member 10. This shoulder is located rearwardly of the cams 17 on said last named member and the cage is angularly or rotatively shiftable thereon with little friction. Such guiding of the cage maintains the desired engagement of the cage bar knife edges 16 with rollers 13 during initial operation and also guide the cage during the reverse overrunning phase, as will be developed.

The cage 12 and rollers 13 carried thereby are normally urged in a direction to push rollers 13 up onto the cams 17 by a pair of circular wire springs 22, 23 concentric with and secured at opposite ends to the cage and cam member 10, respectively. These springs are provided in duplicate, being reversed in their method of securement to the cage and cam member, thereby to mutually offset one another with reference to any radial thrust developed in their operation. They function to the above described ends in a manner which is understood by those skilled in the art, hence is not further illustrated.

The outline of the individual cams 17 constitutes an important feature of the invention. Referring to Fig. 1, it will be noted that these cams are outwardly concave, being defined by arcs of circles which are centered externally of the cam member 10 on equally spaced radii of the circular cam member. These cam surfaces 17 are symmetrical on either lateral side of a plane through their center and the axis of the cam member 10, so that the cam member may be employed interchangeably in a clutch of this type, regardless of the relative direction of driving rotation thereof. In other words, since the operative cam face is the same on either side of the center thereof, it can be employed equally well in driving in either direction, so long as care is taken to employ a cage having lugs 18 with the appropriate backlash clearance D relative to the cam member. That is, if the position of cam member 10 is to be reversed, the cage 12 must be altered and positioned in a manner to locate said lugs with clearance D between the lugs and the abutment wall of the cam member which is opposite surface 20.

Further advantages of the concave outline of the cam surfaces 17 will appear more clearly by reference to Fig. 3, representing a schematic plotting of the wedging angles which are developed between cam rollers and cams of different types as the cam progresses under the roller. Thus at A is plotted the wedging angle for a conventional clutch cam having a convexly curved surface. This exhibits a constant wedge angle, and accordingly a constant angle of application of the radial thrust on the rollers regardless of the extent of advancement of the cam under the roller. In short, any increase in wedging angle which would be expected to result from the angular advancement of the cam beneath the roller is offset by the convexity of the cam surface.

At B I show the comparable wedge angle diagram for a flat cam, i. e., having a planar surface, though inclined to a radial line through the roller. An example of this type of cam is illustrated in Banker Patent No. 2,356,298 referred to above. In this case the angle is theoretically a progressively and infinitely increasing one as the cam progresses under the roller. By its use the cam will be placed in full driving engagement with the roller after a smaller angle of rotation of the cam member than the convex cam whose performance is represented by diagram A. For example, whereas the conventional convex cam whose angle is plotted at A is engageable with the roller upon 6 to 8 degrees of movement of the cam member, angle E in Fig. 1, the flat type exemplified by diagram B will engage and drive upon approximately 4½ to 5 degrees of movement.

While the conventional convexly curved cam is satisfactory enough under ideal conditions, it is susceptible to wedging or freezing under comparatively light shock loads, with resultant failure to release on the overrunning phase when the direction of forces is reversed. If, in an attempt to overcome this, the wedging angle is increased by modifying the convex curve of the cam, then the clutch will not hold in cold weather or with heavy lubrication, and its operation is erratic at best. The flat cam surface whose wedge angle is represented by diagram B represents an improvement over the conventional convex design in elimination of the above described sensitivity to shocks, weather and lubrication. Moreover, the infinitely variable wedging angle offered by a flat cam signifies that the heavier the load and the farther the rollers climb on the cam, the greater the wedging angle becomes, which is advantageous for reasons which will appear.

In diagram C I illustrate the wedge angle relationship produced by the concave cam surface 17 which I have adopted in the embodiment of the clutch illustrated herein. Like diagram B, this shows an infinitely variable angle increasing, however, at a rate substantially greater than in the case of diagram B. This results from the fact that the increase in the effective wedging angle is attributable to two factors, i. e., the rising curvature of the cam surface itself (which may be represented by the portion of the angle beneath the horizontal line), and the advancing angular movement of the cam (which, as in diagrams A and B, may be represented by the portion above the horizontal line).

With a structure of the type described, it will be appreciated that a load applied through cam 17 on roller 13 in the direction indicated by the arrow X in Fig. 1 will exert a force through the roller having an effective clutching component acting on a line radial to both the roller and the driven drum 11, and an ineffective, tangential component at a right angle to said line. Needless to say, the roller 13 is brought into driving engagement with cam 17 after a much smaller angle of advance of the cam than in the case of the convex or flat type cams discussed above, i. e., with the angle E in Fig. 1 representing approximately 3½ degrees of rotation. Furthermore, bearing in mind the rapidly increasing angularity of the wedging action of the concave cam, plus the fact that the load on the roller increases only in proportion to the angular advance of the roller over the cam, it will be seen that the component of radial force transmitted through the roller will remain practically constant even at a greater load imposed on the clutch. This results from the decrease in effective radial component at arrow X and the increase in ineffective component normal thereto as the roller rides further up on the rising cam surface. At the same time, this feature prevents too tight wedging of the roller under a sudden shock load, and resultant refusal or failure to release when the direction of forces is reversed. The earlier and less gradual application of full compressive stress on the rollers is another advantageous feature practically eliminating likelihood of crushing.

A still further feature of advantage of the concave surface is the wider contact of the cam and roller resulting from the concave outline of the former, which yields increased life and load capacity. Of course, the contact between the cylindrical roller and the cam surface is theoretically purely a line contact. However, the slight resilient distortion of the surface of the roller or cam in actual operation under heavy load (though well within the elastic limit) results in what is actually an area contact, over which the load transmitted is distributed at lower unit pressure.

In operation of the device, assuming the clutch has been installed in association with a driving instrumentality serving to rotate cam member 10 in counterclockwise direction, and the drum member 11 is connected to an instrumentality to be driven, the cam surfaces 17 initially shift counter-clockwise relative to rollers 13. The latter are engaged above their centers by the lower adjacent knife edges 16 of the cage bars 15, ride upwardly on the cam surface, and become wedged between the latter and the inner periphery of drum member 11, more particularly, on the machined inwardly projecting annular land 24 on the drum. It will be appreciated that after a relatively short period of operation, those of the knife edges 16 which happen to exert higher pressure engagement of their associated roller on the cams than the others, due to any of the factors of inaccurate manufacture discussed above, will become worn down and rounded to a greater or lesser extent along their length. Hence, any lasting inequality in the forces impelling engagement of the rollers with their respective cams is eliminated and, following a short period of wear-in operation, all rollers are uniformly urged for wedging engagement against their respective cam surfaces. It follows that the radial driving thrust transmitted from the cam surfaces to the drum interior is equally distributed among the rollers.

Assuming that for any reason the angular speed of the drum member exceeds the intended sustained speed of the cam member, the clutch disengages and freewheeling or overrunning occurs. In this phase, in conventional clutches of the type under consideration, the springs 22, 23 continue to urge the rollers to operative position against the cam surface while the rollers attempt to make a rotating contact at three points, namely, the drum, cage and cam, and the result is local flattening or scuffing of the rollers or digging of the cam. The present construction overcomes this defect by its assembly of the cam member and the roller cage as a unit, in which said cage is angularly shiftable upon its annular shoulder 21 on the cam member both by and in opposition to springs 22, 23, under the application of a very slight force. Alternatively, as may be desirable under certain circumstances, the cage may receive its rotatable guiding from the outer drum member, but the principle is the same in either case. As stated, the dimension D of the backlash opening between the lug or "fish tail" 18 and the adjacent stop surface 20 of the cam member is established at about one-sixteenth of an inch when the clutch is in the driving phase. In the idling or overrunning phase a definite centrifugal force is created on the rollers, causing them to exert a predetermined drag against the interior of the drum 11.

The cumulative drag effect thus exerted on the drum by all the rollers is sufficient to overcome the torque exerted on cage 12 by springs 22, 23, so that the cage is caused to rotate counterclockwise on and relative to the cam member. It will be appreciated that the strength of the springs and the weight of the rollers are carefully controlled to bring about the correct drag action and to produce the desired counterclockwise creep of the cage, until the backlash space D is traversed and lug 18 engages the cam member stop surface 20. When this occurs, the cam member positively pushes against the cage during the overrunning phase, until the rollers depart from their cam-engaged position and are in a position about one-sixteenth inch to the left thereof, equal to the spacing D, as indicated in dotted lines in Fig. 1. Centrifugal force on the rollers insures that they are maintained radially outwardly from the cam surface 17 and against the drum 11, creating definite radial clearance between the cam surface and said dotted line position of the rollers.

The result is that the rollers are freed from the three-point contact so objectionable in previous designs and now have only two points of contact, i. e., on the drum surface and on the cage cross bar 15. Therefore, instead of attempting to establish rotative or moving contact at three points, the rollers merely skid at one point and rotate at another; the result is that scuffing and flattening of the rollers, grooving or digging of the cam and/or scuffing or scratching of the drum are eliminated. Following prolonged and continued use, the rollers of the present clutch remain perfectly round, highly polished and show very little wear.

These advantages are directly attributable to the association of the cage with one of the driving or driven members in a relatively anti-frictionally rotatably guided relation thereto, and wherein the cage functions not only in establishing uniformity of wedging engagement of the cams during the driving phase of the clutch, but also shifts and assures disengagement of the rollers from the cam surface during the inoperative or free wheeling phase.

It will also be appreciated that the simplicity of the concept of positioning of the cage separator bars 15 radially outwardly of the center line or locus of the cam roller centers, so as to provide individual contact lines capable of wearing in quickly during the initial life of the clutch, should in no wise obscure the importance of this improvement. It nullifies the effect of slight manufacturing errors in the cam outline or spacing, or the cage design or manufacture, with the result of a uniformity of distribution of the forces through the roller which is quite unusual in such an inexpensive construction. As stated, the concaved curved cam design lends itself to quick, positive and unfailing engagement and disengagement of the clutch, places a smaller unit pressure on the rollers, and enables the transmission of approximately uniform radial force by the rollers regardless of load. Moreover, the cam member, since its cam surfaces are laterally symmetric, is adapted to be used interchangeably, regardless of the desired direction of drive. The clutch as a whole is relatively simple and very strong, and capable of fabrication at a cost which is very small indeed, considering the high degree of accuracy and reliability imparted thereto by the above described features. It is especially well adapted for use in applications having a high incidence of shock loads.

I claim:

1. An overrunning clutch comprising concentric, rotatable driving and driven members having radially spaced driving surfaces, one of which is a shaped cam surface, a cage interposed radially between said members and mounted for low-friction floating rotation relative thereto, circumferentially spaced roller elements rotatively carried by said cage between said surfaces, spring means normally urging said cage to engage said roller elements between said surfaces in a direction opposite the direction of rotation of said driving member in the driving phase of clutch operation, said spring means being so proportioned in force as to yield, in the opposite, overrunning phase of operation of the clutch, under the centrifugal radial drag of said elements on the radially outermost of said members, whereby said cage shifts in opposition to said spring means in the direction of overrun of said driven member, said cage and driving member having coacting means disposed in predeterminedly spaced relation to one another during said driving phase and engageable with one another following said last named shift of the cage, to thereby free said roller elements for centrifugal outward positioning relative to the radially innermost of said members.

2. An overrunning clutch comprising concentric, rotatable driving and driven members having radially spaced driving surfaces, said driving member being disposed internally of said driven member, a cage interposed radially between said members and mounted for low-friction floating rotation relative thereto, circumferentially spaced roller elements rotatively carried by said cage between said surfaces, spring means normally urging said cage to engage said roller elements between said surfaces in a direction opposite the direction of rotation of said driving member in the driving phase of clutch operation, said spring means being so proportioned in force as to yield, in the opposite, overrunning phase of operation of the clutch, under the centrifugal radial drag of said elements on the outer driven member, whereby said cage shifts in opposition to said spring means in the direction of overrun of said driven member, said cage and driving member having coacting means disposed in predeterminedly spaced relation to one another during said driving phase and engageable with one another following said last named shift of the cage, to thereby free said roller elements for centrifugal outward positioning relative to said driving member.

3. An overrunning clutch comprising concentric, rotatable driving and driven members having radially spaced driving surfaces, said driving member being disposed internally of said driven member and having said surface thereof shaped to provide cam elements, a cage interposed radially between said members and mounted for low-friction floating rotation relative thereto, circumferentially spaced roller elements rotatively carried by said cage between said surfaces, spring means normally urging said cage to engage said roller elements between said surfaces in a direction opposite the direction of rotation of said driving member in the driving phase of clutch operation, said spring means being so proportioned in force as to yield, in the opposite, overrunning phase of operation of the clutch, under the centrifugal radial drag of said elements on the outer driven member, whereby said cage shifts in opposition to said spring means in the direction of overrun of said driven member, said cage and driving member having coacting means disposed in predeterminedly spaced relation to one another during said driving phase and engageable with one another following said last named shift of the cage, to thereby free said roller elements for centrifugal outward positioning relative to said cam elements.

4. A unidirectional overrunning clutch of the type described, comprising concentric driving and driven members, one of which is a cam member, a cage radially interposed between said members and provided with a plurality of roller elements arranged in a circumferential spaced series between the members for engagement and transmission of driving torque between said members, spring means resiliently urging said cage in one rotative direction to wedge said roller elements between the members in position for a driving phase of clutch operation, means for guiding said cage for anti-friction floating rotation relative to said driving member in an overrunning phase of operation, said roller elements exerting centrifugal drag against said driven member during said overrunning phase and the strength of said spring means being such that the spring means yields to permit creep of said cage relative to said driving member, during said overrunning phase, in opposition to said spring means, and coacting means on said cage and driving member positively engageable with one another to terminate said creep after a predetermined increment thereof.

5. A unidirectional overrunning clutch of the type described, comprising concentric inner driving and outer driven members, said driven member being a cam member, a cage radially interposed between said members and provided with a plurality of roller elements arranged in a circumferential spaced series between the members for engagement and transmission of driving torque between said members, spring means resiliently urging said cage in one rotative direction to wedge said roller elements between the members in position for a driving phase of clutch operation, means on said driving member for guiding said cage for anti-frictional floating rotation relative thereto in an overrunning phase of operation, said roller elements exerting centrifugal drag against said outer driven member during said overrunning phase and the strength of said spring means being such that the spring means yields to permit creep of said cage relative to said driving member, during said overrunning phase, in opposition to said spring means, and coacting means on said cage and driving member positively engageable with one another to terminate said creep after a predetermined increment thereof.

6. An overrunning clutch comprising concentric, rotatable and radially spaced members having radially spaced driving surfaces, one of said members being rotatable in normal operation of the clutch at the maximum speed of a clutch-driving or -driven mechanism and having a shaped cam surface, the other member being rotatable relative to said sustained speed member in another, overrunning phase of operation, a cage interposed radially between said members and mounted for low-friction floating rotation relative thereto, circumferentially spaced roller elements rotatively carried by said cage between said surfaces, spring means normally urging said cage to engage said roller elements between said surfaces in a direction opposite the direction of rotation of said sustained speed member in normal clutch operation, said spring means being so proportioned in force as to yield, in the overrunning phase of clutch operation, under the centrifugal radial drag of said elements on the radially outermost of said members, whereby said cage shifts in opposition to said spring means in the direction of overrun of said relatively rotatable member, said cage and sustained speed member having coacting means disposed in predeterminedly spaced relation to one another during normal operation and engageable with one another following said last named shift of the cage, to thereby free said roller elements for centrifugal outward positioning relative to the radially innermost of said members.

OSCAR H. BANKER.

REFERENCES CITED

The following references are of record in the file of this patent:

UNITED STATES PATENTS

| Number | Name | Date |
|---|---|---|
| 1,708,215 | Chryst | Apr. 9, 1929 |
| 1,938,997 | Burroughs | Dec. 12, 1933 |
| 2,119,622 | Freber | June 7, 1938 |

FOREIGN PATENTS

| Number | Country | Date |
|---|---|---|
| 303,435 | Great Britain | Jan. 3, 1929 |
| 424,835 | Great Britain | Mar. 1, 1935 |
| 635,154 | Great Britain | Mar. 9, 1928 |
| 635,157 | France | Dec. 20, 1927 |